United States Patent [19]

Snedkerud

[11] 4,344,169
[45] Aug. 10, 1982

[54] METHOD OF CONNECTING TWO SHORT-WAVE TRANSMITTERS IN PARALLEL

[75] Inventor: Ole Snedkerud, Windisch, Switzerland

[73] Assignee: Patelhold Patentverwertungs- & Elektro-Holding AG, Glarus, Switzerland

[21] Appl. No.: 143,103

[22] Filed: Apr. 23, 1980

Related U.S. Application Data

[63] Continuation of Ser. No. 912,305, Jun. 5, 1978, abandoned.

[30] Foreign Application Priority Data

Jun. 15, 1977 [CH] Switzerland .................. 7380/77

[51] Int. Cl.³ ................. H04B 7/00; H04B 1/50
[52] U.S. Cl. ....................... 370/40; 455/105
[58] Field of Search ........... 370/40, 38, 39; 455/6, 455/19, 193, 272, 277, 279, 289, 105, 103, 92, 113; 343/100 SA, 854

[56] References Cited

U.S. PATENT DOCUMENTS 3,503,011 3/1970 Keller .
3,617,922 11/1971 Bernstein .
3,754,188 8/1973 Wilkens ........................ 455/105
4,127,829 11/1978 Levy et al. ..................... 455/103

FOREIGN PATENT DOCUMENTS 1809005 6/1970 Fed. Rep. of Germany .
1541465 12/1970 Fed. Rep. of Germany .
2059722 6/1972 Fed. Rep. of Germany .
 615783 2/1980 Switzerland .
1184462 3/1970 United Kingdom .

Primary Examiner—Thomas A. Robinson
Attorney, Agent, or Firm—Orville N. Greene; Frank L. Durr

[57] ABSTRACT

The specification discloses a method for connecting first and second transmitters, each containing its own oscillator, in parallel and to first and second aerial halves, respectively. A phase difference signal representative of the phase difference between the two signals generated by the transmitters and applied to respective aerial halves is generated. The phase of the signal generated by one of the transmitters is adjusted by means of a reactance circuit in the oscillator of the transmitter as a function of the phase difference signal. The oscillator of the remaining transmitters is permitted to oscillate independent of the phase difference signal.

14 Claims, 4 Drawing Figures

METHOD OF CONNECTING TWO SHORT-WAVE TRANSMITTERS IN PARALLEL

RELATED APPLICATIONS

This is a continuation of U.S. patent application Ser. No. 912,305, filed June 5, 1978, now abandoned.

BACKGROUND OF THE INVENTION

The invention relates to a method of connecting two short-wave transmitters in parallel to an aerial which is divided into two halves, each half being fed by a separate transmitter. A phase discriminator is provided to monitor the difference in phase between the transmitters and to generate an output signal which supplies information for the correct phase regulation.

Such methods have long been in use. If two transmitters are to run in parallel in the short-wave range, then, as a result of the difficulty of realizing a short-wave parallel-connection bridge, the aerial must be divided into two halves, each half being fed by a separate transmitter. In order to be able to avoid an unwanted "slewing", that is to say an undesirable alteration in the radiation direction of the combined aerial, the phase of the two transmitter signals must be adjustable and must be able to be checked.

At present, the monitoring is effected by means of a phase discriminator and the phase rotation is effected by means of a manually adjustable phase shifter between the oscillator and one of the two transmitters, while the second transmitter is fed directly from the same oscillator. Thus the synchronism in frequency is assured. Despite the considerable size of the short-wave frequency range, the realization of the phase discriminator does not involve any major problems. Nevertheless a broadband phase-rotation circuit is very extensive and relatively expensive.

The foregoing method has been found to be unsuitable for remote-controlled transmitter installations for the following reasons:

(1) under certain circumstances, the transmitters have different phase rotations in the cold and in the warm state;

(2) remote-control channels are required for remote control of the phase regulation;

(3) the regulation must be constantly checked which requires additional operational expense; and (4) the ambiguity between 0 degrees and 180 degrees must be eliminated by a sensing system since the system can be adjusted 180° out of phase.

BRIEF DESCRIPTION OF THE INVENTION

The object of the present invention is to avoid the above disadvantages of the prior art method and to realize an automatic electronic phase regulation wherein the "slewing" (radiation direction) is adjusted in a simple manner and is automatically assured. This is achieved by monitoring the phase difference of the two lines feeding the two aerials and by adjusting the phase of one of the lines to bring the phase difference to zero. To this end, the invention provides a separate oscillator for each transmitter and adjusts the phase of one of the oscillators while the remaining oscillator runs freely. A phase discriminator monitors the two lines and generates a phase difference signal which adjusts the phase of the controlled oscillator by means of a reactance circuit (preferably a varactor diode).

As a result of the foregoing, the system of the present invention is advantageously useful in large control centers wherein several transmitters are selectively connected to any of several aerial halves. The present system is advantageous because it can provide these connections automatically. Because of the control loop, the 180° ambiguity of the manual system does not occur. Particularly, the control loop would interpret a passage of the voltage through 0 with a phase displacement of 180 degrees as a "labile state" which is automatically avoided (immediate changeover into the stable position).

For "slewing", that is for the alteration of the main beam direction of a transmission antenna, the proposed system of the invention can use by-passes which are also used in the prior art systems to by-pass transmission in the feeder lines of both halves of the antenna. Such by-passes are mounted at locations located after the reference points wherein the phase of the two feeder lines is detected. With the system of the invention, the station can even be made cheaper, in that the by-pass lines can be eliminated.

Any delay lines of normal coaxial cables can be used between the reference points and the discriminator inputs. The switching over of the various lengths for the purpose of introducing the required phase displacements is effected by means of cheap coaxial cable and coaxial switches instead of large aerial switches and power feeders. In order to avoid unwanted HF irradiation, the cables are simply rolled up and shielded.

In the method according to the invention, phase control is provided by a servo loop consisting of a phase discriminator, an amplifier with a low-pass filter, and a phase-shifting device. The phase shifting device comprises a varactor diode and a reactance tube or other known circuit in parallel with the crystal in the oscillator. With a maximum difference in frequency between the two oscillators to be synchronized, the control loop must be so dimensioned that the lock-in range is sufficiently great. The holding range is normally much greater than the lock-in range. The phase at the reference points is rigidly controlled by the output signal of the phase bridge, with an error which is inversely proportional to the loop amplification. An error of 2–3 degrees between the reference points can be tolerated.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
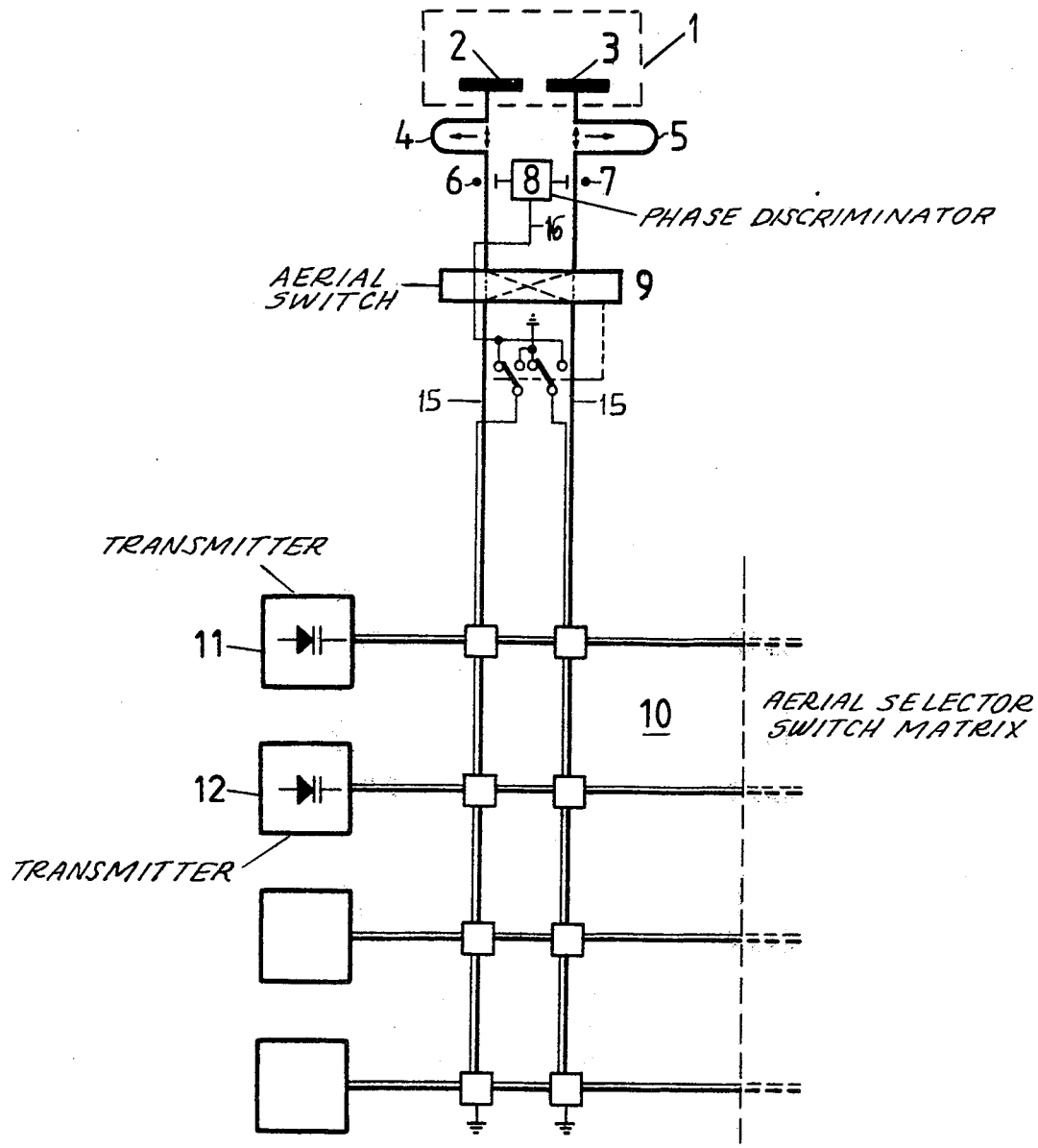
FIG. 1 is a schematic diagram of an antenna connection system capable of carrying out both the process of the present invention and the process of the prior art.

Referring now to the drawings wherein like numerals indicate like elements, there is shown in FIG. 1 an antenna system constructed in accordance with the principles of the prior art and the present invention. The aerial 1 is divided into two halves 2 and 3, which are fed by the transmitters 11 and 12 via "slewing" by-passes 4 and 5, an external aerial switch 9 and an aerial selection switch matrix 10.

A phase discriminator 8 is mounted adjacent the aerials 2, 3 and detects the difference in phase of the two feeder lines 15 as measured at the two reference points 6 and 7. An amplifier with a low-pass filter (described generally above) is integrated into the transmitters 11, 12.

Figure 4:
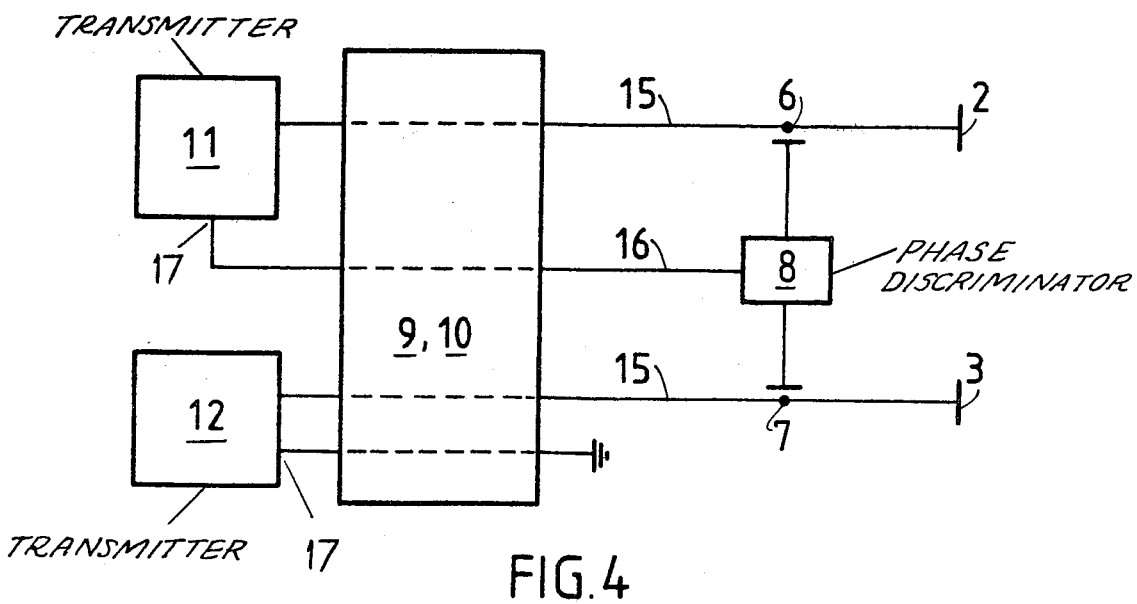
FIG. 4 is a schematic diagram illustrating one possible interconnection of the system of FIG. 1 in accordance with the present invention.

The phase difference signal generated by discriminator 8 is applied to one of the two transmitters (i.e., to the transmitter whose phase is being controlled) via phase monitoring line 16 and matrix 10. More particularly, the phase difference signal is applied to the phase control input 17 (see FIG. 4) of the transmitter being controlled. The phase control input of the remaining transmitter is grounded. Switch 9 determines which transmitter receives the phase difference signal and which is coupled to ground. In this manner, the correct phase position is always assured.

Figure 2:
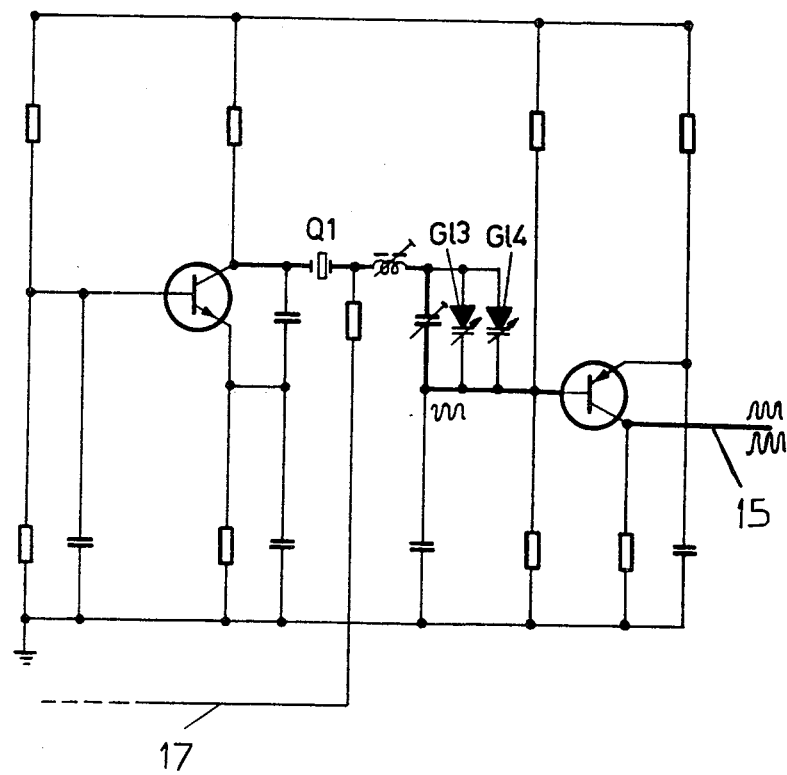
FIG. 2 is a block diagram of one of the transmitters of FIG. 1 which transmitter is constructed in accordance with the present invention.

By way of example, FIG. 2 shows how varactor diodes G13, G14 are connected in parallel with the oscillator crystal Q1 of each transmitter for the phase monitoring and in accordance with the present invention. Simple crystal oscillators are no longer used for transmitters which can be tuned automatically. Instead, known frequency synthesizers (oscillators which can be programmed) are used. In such a case, the reference oscillator of the frequency synthesizers associated with the transmitters are adjusted in decades to the same frequencies and the phase regulating system ensures the correct phase and frequency position of the two transmitters as described above.

Figure 3:
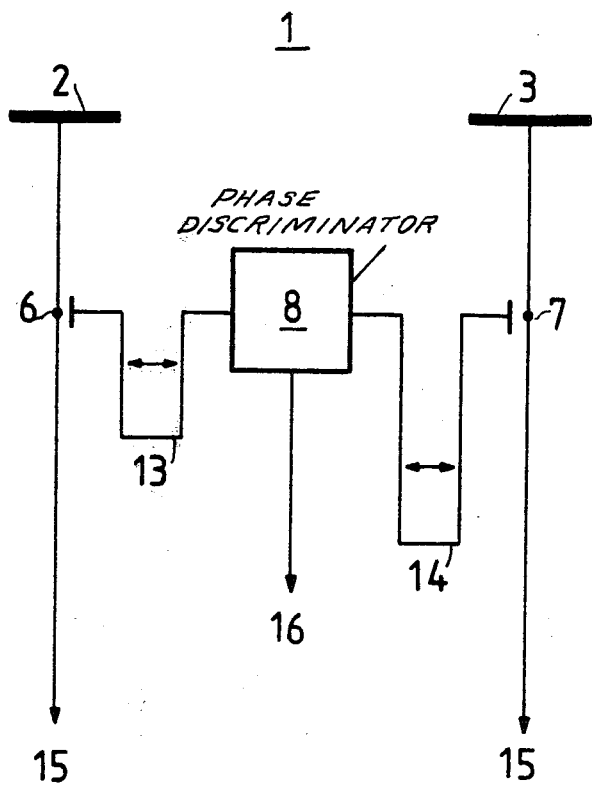
FIG. 3 is a schematic diagram illustrating a possible modification of the system of FIG. 1 in accordance with the present invention.

As already mentioned, the "slewing" by-passes 4 and 5 can be dispensed with using relatively inexpensive elements. Thus, the "slewing" by-passes may be omitted by inserting by-passes which consist of simple coaxial cables between the reference points 6 and 7. This alternative is illustrated in FIG. 3 wherein coaxial by-passes 13 and 14 interconnect discriminator 8 with points 6 and 7. The aerial switches and switching matrix, as well as the transmitters, are the same as shown in FIG. 1. The "slewing" angle is determined by the difference in the adjusted lengths of the two by-passes 13 and 14. The transmitter feed line lengths 15 always remain fixed and need no further adjustment.

The effect of the foregoing is to provide a "phase-locked loop" between the phase discriminator 8 and the two transmitter oscillators 11, 12. The principle has long been known (see, for example, Mallon: "Phase-locked Loop" Funktechnik 1973, No. 2). The phase discriminator 8 (see FIG. 4) compares the phases of the signals in the two feeder conductors 15 at the points 6 and 7, respectively. A signal proportional to the difference in phase between the two signals is conveyed via monitoring line 16 to the varactor diode of the oscillator of the transmitter 11, with such a polarity that the difference in phase in the lines 15 at points 6 and 7 is reduced to 0. The varactor diode of the transmitter 12 is grounded through the matrix circuit 9 and 10 which ensures that the monitoring line 16 and the feeder line 15 are connected to the appropriate transmitters. The only condition for operation is that the transmitters 11 and 12 are adjusted to the same frequencies.

In the method according to the invention, it is of decisive importance that the phase difference between the signals in the lines 16 as measured at points 6 and 7, can be automatically reduced to zero using very simple means and that this can be accomplished independently of the transmitter selected and of the aerial switch combination. Neither the length of the feeder lines 15 nor the phase rotations within the individual transmitters from the cold to the warm state play any part in this connection.

In addition, the phase regulating loop leads to the following advantages:

dispensing with an expensive and extensive broadband phase shifter which in some circumstances would require a remote control, increased reliability due to the electronic mode of operation (no wear of mechanical elements), reduced cost of the aerial "slewing" system owing to the fact that the phase displacement can be carried out in low-power cables between the reference points and phase discriminators, and facilitating the operation because of a completely automatic and unambiguous mode of operation. A remote control is superfluous; a remote monitoring for checking purposes is possible without much expense.

The present invention may be embodied in other specific forms without departing from the spirit or essential attributes thereof and, accordingly, reference should be made to the appended claims, rather than to the foregoing specification as indicating the scope of the invention.

What is claimed is:

1. A method for connecting first and second transmitters, each containing its own oscillator, in parallel with one another and to first and second aerial halves, respectively, said first and second transmitters generating first and second signals, respectively, said method comprising the steps of:

applying said first and second signals to said first and second aerial halves, respectively;

generating third and fourth signals respectively representative of the phase of said first and second signals;

applying said third and fourth signals to a phase difference signal generator by means of first and second bypasses, respectively;

generating, in said phase difference signal generator, a phase difference signal representative of the phase difference between said first and second signals generated by said transmitters and applied to said respective aerial halves;

adjusting the phase of said first signal generated by said first transmitter, by means of a reactance circuit electrically connected to said oscillator of said first transmitter, as a function of said phase difference signal while said oscillator of said second transmitter is permitted to oscillate and generate said second signal independently of said phase difference signal; and adjusting the length of at least one of said bypasses when it is desired to change the angle of said transmitters.

2. A method as claimed in claim 1, wherein said reactance circuit comprises a varactor diode.

3. A method as claimed in claim 2, wherein said reactance circuit is connected in parallel with a crystal of said first transmitter, said crystal and said reactance circuit cooperating to control the phase of said first signal.

4. A method as claimed in claim 1, wherein said reactance circuit is connected in parallel with a crystal of said first transmitter, said crystal and said reactance circuit cooperating to control the phase of said first signal.

5. A method as claimed in claims 1, 2, 3 or 4, wherein an amplifier with a low-pass characteristic is connected between said phase discriminator and said reactance circuit.

6. A method as claimed in claim 5, wherein said first and second signals generated by said transmitters are applied to said aerial halves via an aerial selecting switch matrix.

7. A method as claimed in claim 6, wherein said oscillators are made in a form which can be programmed as frequency synthesizers.

8. An apparatus for controlling the phase difference between first and second transmitters connected in parallel with each other and connected, respectively, to first and second aerial halves, said apparatus comprising:

a first transmitter, including a first oscillator, for applying a first signal to a first half of an aerial;

a second transmitter, including a second oscillator, for applying a second signal to a second half of said aerial;

phase discriminator means for generating a phase difference signal representative of the phase difference between said first and second signals;

first bypass means for applying a third signal representative of the phase angle of said first signal to said phase discriminator means;

second bypass means for applying a fourth signal representative of the phase angle of said second signal to said phase discriminator means; said first and second bypass means respectively comprising first and second simple coaxial cables;

adjusting means for adjusting the difference in length between said first and second coaxial cables, for determining the slewing angle of said transmitters; and reactance circuit means electrically connected to said first oscillator for adjusting the phase angle of said first signal responsive to said phase difference signal.

9. An apparatus as claimed in claim 8, wherein said reactance circuit means comprises a varactor diode.

10. An apparatus as claimed in claim 8 or 9, wherein said first oscillator comprises a crystal, and wherein said reactance circuit means is connected in parallel with said crystal and cooperates therewith to control the phase angle of said first signal.

11. An apparatus as claimed in claim 10, further comprising a low-pass amplifier connected between said phase discriminator means and said reactance cicuit means.

12. An apparatus as claimed in claim 11, further comprising an aerial selecting switch matrix for applying said first and second signals to respective said halves of said aerial.

13. An apparatus as claimed in claim 12, wherein said first and second oscillators are such that they can be programmed as frequency synthesizers.

14. An apparatus as claimed in claim 8, wherein said adjusting means comprises coaxial switch means.

* * * * *